Sept. 2, 1947.  G. E. WHITE  2,426,654
REMOTE INDICATOR FOR RADIO PULSE SYSTEMS
Filed May 25, 1943
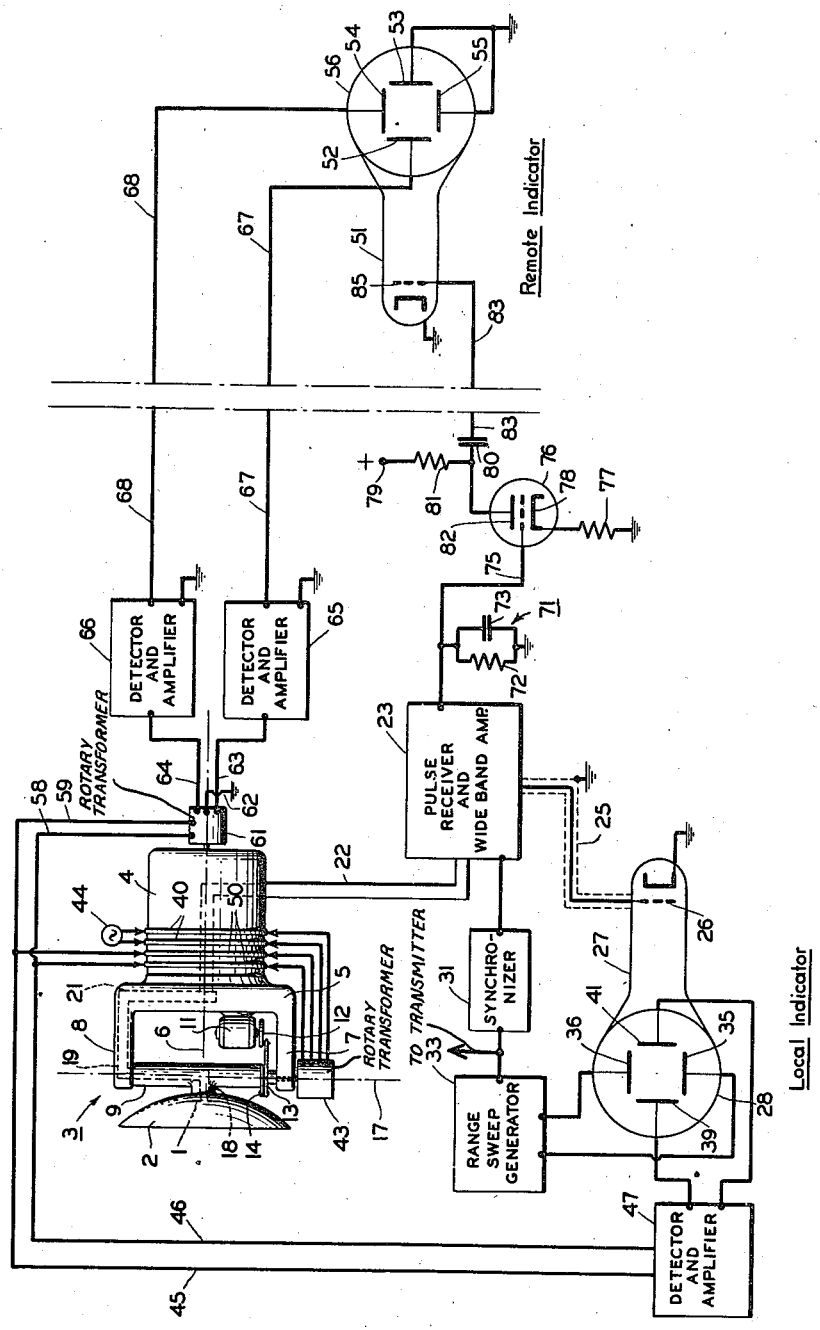
INVENTOR,
GIFFORD E. WHITE,
BY *Paul B. Hunter*
HIS ATTORNEY Patented Sept. 2, 1947

2,426,654

UNITED STATES PATENT OFFICE 2,426,654

REMOTE INDICATOR FOR RADIO PULSE SYSTEMS

Gifford E. White, Hempstead, N. Y., assignor to Sperry Gyroscope Company, Inc., a corporation of New York Application May 25, 1943, Serial No. 488,369

9 Claims. (Cl. 250—1.62)

This invention relates, generally, to pulse systems, such as those used for indicating and measuring distance between two objects.

The invention particularly concerns a remote indicator circuit which may be used in connection with receivers providing a high resolution of received pulses of energy.

Radio pulse systems have been used extensively for measuring distance and many different systems have been proposed. In some systems a short sharp pulse of high frequency energy is transmitted and the time interval for this pulse to be reflected by an object and received at the point from which it is usually transmitted, is measured. Since the time interval involved is relatively short, the most advantageous method of indication is that provided by a cathode ray tube.

The electron beam of a cathode ray tube may be swept across the screen at a frequency having an integral relation with the repetition rate of transmitted pulses. Received pulses are applied to the intensity control grid of the cathode ray tube causing a spot to appear when a pulse of energy is received. By suitably synchronizing the sweep of the cathode ray beam and the transmission of pulses, it is possible to provide an indication of the elapsed time between the transmission of pulses and the reception of reflected pulses.

It will be apparent that the accuracy of such an indication depends upon the velocity of the sweep of the cathode ray beam, and also upon the quality of resolution provided by the receiver in applying pulses to the intensity control grid of the tube. It is necessary in most cases to use high fidelity receivers using a wide band amplifier for applying a short, sharp pulse to the intensity control grid of the cathode ray tube that has approximately the same wave shape as a transmitted pulse.

In addition to range indicators, such as that described, the same radio pulse systems may also be used for indicating the approximate location of an object. This may be accomplished by periodically scanning a directional antenna for the transmitter or receiver over a portion of space, and scanning the beam of a cathode ray tube in synchronism with the antenna. The application of a received pulse of energy to the intensity control grid of the cathode ray tube causes a spot to appear upon the screen of the tube. This spot is located on the tube in a position corresponding to the position of the antenna at the time the pulse is received, thus indicating the approximate direction from which the pulse is reflected or radiated by an object. In this type of indication the cathode ray beam is moved at a slower rate over the screen of the tube, reducing the necessity for providing high resolution of received pulses.

It is difficult to supply short, sharp pulses to a remote indicator or cathode ray tube because such pulses include a very wide band of frequencies. The sharp or square wave shape of such pulses is obtained by providing a relatively large number of harmonics, in addition to the fundamental frequency. It is necessary to transmit all of these harmonics, and particularly the upper harmonics, in order to maintain the square wave shape.

Since the upper harmonics have relatively high frequencies, it is difficult to transmit them over great distances, even with high impedance co-axial cables. The best of such cables have a certain amount of capacity. This capacity is proportional to the length of the cable. In transmitting short pulses over such cables, it is necessary to charge the capacity of the cable during a very short interval. The current necessary to charge the capacity within this short time is beyond the capacity of the ordinary electronic tubes which are customarily used in present day equipment. Even if special tubes are used to provide the necessary charging current, a pulse loses its sharpness during transmission because the higher harmonics are by-passed to ground. Hence, the high resolution provided by the receiver may only be used if the indicator is located near the receiver.

However, the same high fidelity receiver may also be used to control remote indicators which do not require high resolution of received pulses. Such indicators may be actuated by a pulse that has a large time interval and a smooth wave form as compared with short, sharp received pulses. It is only necessary that the pulse applied to a remote indicator have sufficient amplitude to actuate the intensity control grid of the cathode ray tube.

It is, therefore, one object of the present invention to provide a remote indicator circuit that may be used with a high resolution pulse detection system.

Another object of the invention is to provide a remote indicator circuit in which sharp received pulses are converted into a form which is more easily transmitted to a remote point.

Other objects and advantages of the invention will become apparent from the following specification and accompanying drawing.

The drawing, which contains only one figure, shows a radio pulse system, such as that heretofore described, including a remote indicator circuit comprising the present invention.

As shown in the drawing, an antenna 1 having a reflector 2 for providing the antenna with a highly directional beam pattern is supported on a scanner, indicated generally at 3. The scanner 3 includes a main portion 4 forming the housing of a motor which is adapted to rotate a bracket 5 about a "spin axis" 6 of the scanner. The bracket 5 has arms 7 and 8 in which is journalled a shaft 9 that carries the antenna 1 and reflector 2. A motor 11, mounted on the bracket 5, drives through a crank wheel 12, link 13, and an arm 14 on shaft 9, to slowly oscillate shaft 9 about a "nod axis" 17.

The antenna 1 is connected by suitable wave guides 18, 19, 21 and 22 having conventional rotary joints, to a high frequency radio receiver 23. The receiver 23 may be of any suitable design including a wide band amplifier for maintaining the wave form of short, sharp pulses which may be received.

Pulse energy may be radiated by a transmitter 30 (not shown) located at the receiver or by a transmitter at the object, the distance of which is to be measured. Such transmitters are usually designed to periodically radiate short, sharp pulses of ultra high frequency radio energy. It is necessary that the receiver 23 be of a high fidelity type providing a uniform response of a very wide band of frequencies depending upon the time interval of the pulse being received. Such receivers and amplifiers are sometimes referred to as "video" circuits.

The output of receiver 23 is connected by coaxial cable 25 to intensity control grid 26 of cathode ray tube 27. The tube 27 is normally biased to cut-off. The reception of a pulse by the receiver 23 causes a positive voltage pulse to be applied to the grid 26, thereby permitting the electron beam to flow for a short time interval as determined by the pulse.

The manner in which the electron beam is positioned on the screen 28 of the tube 27 will now be described. A synchronizer 31 is adapted to synchronize the receiver 23 and a range sweep generator 33 with the transmitter of the short, sharp pulses which are to be received. The synchronizer 31 may be controlled directly by the transmitter if it is located near the receiver or in the case of a remote transmiter, by a separate synchronizing channel. The synchronizing circuit may be of any conventional design, the specific details of which do not form a part of the present invention.

The synchronizer 31 may be used to control a gate circuit in the receiver 23 to determine the period during which the receiver is sensitive as well as to control a range sweep generator 33.

Immediately following the transmission of each pulse, synchronizer 31 causes the range sweep generator 33 to apply a voltage to vertical deflecting plates 35 and 36 of the cathode ray tube 27 to sweep the cathode ray beam across the screen 28. The velocity of this sweep must be sufficiently high to completely move the beam across the screen within a time interval during which it is contemplated a pulse will be received. This time interval is usually of the order of a few micro-seconds, depending upon the distance being measured.

The horizontal position of the electron beam, as determined by horizontal deflecting plates 39 and 41, may be adjusted in accordance with the "nod" angle of the antenna, as described in copending application Serial No. 483,698, filed April 19, 1943, for Indicating method and apparatus for a detection system, in the name of J. E. Shepherd. A suitable rotary transformer 43 of any conventional type is energized from a source 44 through slip rings 49. The windings of the transformer are displaced in accordance with movements of the antenna 1 about the nod axis. The amplitude of the output voltage of the transformer thereby varies in accordance with the "nod" position of the antenna 1. This voltage is supplied through slip rings 50 and leads 45 and 46 to a suitable detector and amplifying circuit 47, which may be of conventional design, such as that shown in the above-mentioned copending application which will apply a voltage to the horizontal deflecting plates 39 and 41 to position the cathode ray beam on the screen 28 in accordance with the "nod" position of the antenna 1.

The foregoing description is one example of many systems which have been proposed to indicate the distance between two objects by measuring the time of travel of a pulse of high frequency energy. The system, shown in the drawing, also provides an indication of the path through which the directional beam pattern of the antenna 1 is being moved at the instant a pulse of energy is received. As has been explained, it is necessary that the cathode ray tube 27 be located reasonably near the receiver 23. It is difficult to transmit a short, sharp pulse corresponding to the received pulse over an appreciable distance even though a high impedance coaxial cable, such as cable 25, is used. Since the range sweep generator sweeps the cathode ray beam vertically across the screen 28 within the space of a few micro-seconds, it is, of course, necessary that a short, sharp pulse be applied to the grid 26 in order to provide reasonable resolution on the screen 28.

In addition to the cathode ray tube 27, it is sometimes desirable to have an indicator of some form at a point remote from the receiver 23. For example, in the case of object detection equipment, it may be desirable to have a local indicator, such as the tube 27, at the point at which the receiver 23 is located, and to have a remotely positioned indicator for use of a coordinating official. In such a case, a number of receivers scattered over a large area may have remotely controlled indicators located at a central point so the activities of the various receivers can be coordinated.

Another application is that of air-borne equipment in which one high resolution indicator is provided near the receiver 23 and remote indicators are provided for a pilot and, in some cases, for a gunner in a turret which is mounted on an aircraft for rotation about two independent axes. The difficulties of supplying a sharp, short pulse to such remote points are obvious. One major difficulty is that encountered in connecting a coaxial cable or other high impedance transmission line to a turret of the character described because rotary coupling and other bulky and expensive equipment is required. Even if a suitable transmission line were provided, the sharpness of the pulse would be lost in transmission due to the capacity inherent in such a cable.

As has been heretofore mentioned, the capacity of such a transmission line increases with its length. As this capacity increases, the current drain on an amplifying tube also increases. The pulses are of extremely short duration, so it is necessary to charge the capacity of the line within a relatively short time. Hence, the charging current must be high and may exceed the capacity of tubes usually used in this type of equipment. If the pulse is amplified sufficiently to overcome the loss in amplitude during transmission to a remote indicator, the amplifier is called upon to provide an even higher charging current. However, it is possible to take advantage of the fact that a remote indicator need not be supplied with a short, sharp pulse in order to indicate the position of the receiving antenna at the instant a pulse is received.

One arrangement for scanning the electron beam of a remote indicator is shown in the drawing. A remotely positioned cathode ray tube 51 has its cathode ray beam deflected by horizontal deflecting plates 52 and 53 and vertical deflecting plates 54 and 55, respectively. Suitable voltages are applied to these plates in a manner to be described which causes the electron beam to scan the screen 56 of the tube 51 in synchronism with the scanning movements of the antenna 1.

As has been described, the voltage output of the rotary transformer 43 varies in amplitude in accordance with the nod angle of the antenna 1. This varying voltage is connected by leads 58 and 59 to a winding of a rotary transformer 61, the rotor of which is rotated in accordance with the "spinning" movements of the scanner 3. The transformer 61 includes two-phase windings each leg of which has an end connected to ground, as at 62. The free end of the two-phase windings are connected to leads 63 and 64. It will be apparent that voltages appearing on leads 63 and 64 are displaced electrically by approximately 90°.

Rotation of the antenna 1 about the "spin" axis 6 of the scanner causes relative movement between the windings of transformer 61 which varies the voltage appearing on leads 63 and 64 at a "spin" frequency depending upon the "spinning" rotation rate of the scanner. Thus voltage having a frequency corresponding to the spin frequency and varying in amplitude in accordance with the nodding movements of the antenna appear on leads 63 and 64. These voltages, which are displaced in phase in 90° are supplied to suitable detector and amplifier circuits 65, and 66.

A similar voltage appears on lead 68. The voltage appearing on lead 67 is applied to horizontal deflecting plates 52 and 53, whereas the voltage appearing on lead 68 is applied to vertical deflecting plates 54 and 55 of the tube 51.

Since these two voltages are displaced by 90°, it will be apparent that the cathode ray beam of the tube 51 is rotated at the spin frequency to define a circle on the screen 56. However, the amplitude of these voltages is varied in accordance with the nod angle of the antenna 1. Hence, the diameter of the circle defined by the cathode ray beam varies, and causes the beam to follow a spiral pattern in scanning the screen 56.

It will be apparent that the beam of the cathode ray tube 51 is continuously positioned in accordance with the position of the antenna 1 on the scanner 3. Therefore, a spot appearing on the screen corresponding to the reception of a pulse by the receiver 23 will be positioned in accordance with the position of the antenna 1 at the instant the pulse is received.

In order to transmit a received pulse to the remotely positioned cathode ray tube 51, the sharp pulse is first averaged by a network, such as the filter network 71 including a resistor 72 and condenser 73. By appropriately selecting the resistance of resistor 72 and capacity of condenser 73, the sharp, short pulse may be converted or averaged to a pulse of any desired amplitude and duration. In this manner, the short pulse may be spread over a greater time interval due to the charging and discharging action of the condenser 73. Obviously, the higher frequencies are bypassed by the condenser, thus reducing the amplitude of the pulse. However, the increased time interval makes it possible to amplify the pulse in such a manner that it may be transmitted over a conventional transmission line.

The averaged pulse is now applied by lead 75 to the grid of a conventional triode amplifier 76, the bias of which is provided by a resistor 77 in the circuit of cathode 78. Suitable voltage is applied from a source 79 through a load resistor 81 to plate 82 of the tube 76. The amplified pulse appearing across resistor 81 is coupled by condenser 80 to any transmission line 83, which may be of either a low impedance or high impedance type. Since the pulse no longer contains the higher harmonics, it is not essential that a high impedance transmission line be used. The transmission line 83 is connected to grid 85 of the cathode ray tube 51.

When a short, sharp pulse is received by the antenna 1, the receiver 23 applies a similar short, sharp pulse to the grid 26 of the local cathode ray tube 27, thereby providing a high resolution range indication on the screen 28. At the same time, the receiver output, as represented by lead 75, is applied to the averaging or filter network 71, whereby the time interval of the pulse is enlarged and its amplitude and sharpness reduced. The pulse to be averaged is amplified by the amplifier 76 and supplied to grid 85 of the cathode ray tube 51. Since the beam of the tube 51 is scanned in accordance with the scanning movements of the scanner 3, a pulse on the grid 85 causes a spot to appear on the screen 56 of the tube 51 and the spot is positioned to indicate the direction from which the pulse is received.

If a low impedance transmission line were connected directly from the receiver 23 to the grid 85, the amplitude of the received pulse might be reduced to such a point that it would be insufficient to actuate the grid 85. This situation cannot be overcome by merely amplifying the sharp pulse because, as has been explained, a high current is necessary for even a high impedance coaxial transmission line of appreciable length due to the shortness of the pulse and the shortness of the charging interval. By first averaging the short, sharp pulse and then amplifying it, it is possible to use a high capacity line to apply the pulse to grid 85 of the remote indicator.

It will be apparent, therefore, that the present invention permits the use of the output of a wide band amplifier to energize the grid of a remote indicator of a cathode ray tube by first averaging the output and then amplifying it before supplying the pulse to the connecting line between the grid of the remote indicator and the amplifier. The lengthened pulse permits a longer charging interval so the current drain on the amplifier is reduced, to a point where conventional tubes may be used. Furthermore, the higher harmonics of the sharp pulse are discarded so the necessity for a high impedance transmission line is reduced. For these reasons, signals may be readily supplied to a remote indicator, even though it is positioned within a turret on an aircraft. However, this is merely intended as one illustration of the use of the present invention. Obviously, it has other uses of equal importance.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio pulse receiving system, in combination, a local cathode ray tube, a wide band amplifier for providing a high resolution indication of received pulses on the screen of said local cathode ray tube, a remote indicator circuit including a cathode ray tube remote from said amplifier, an averaging network connected to the output of the wide band amplifier for averaging said pulses, and means connected to said network for supplying said averaged pulses to said remote cathode ray tube.

2. In a radio pulse receiving system, in combination, a wide band amplifier constructed and arranged to maintain a high resolution of received pulses, a remote cathode ray tube at a distance from said amplifier, an averaging network connected to the output of said wide band amplifier for averaging said high resolution pulses, an amplifier in circuit with said network for amplifying said averaged pulses, and means connected to said amplifier for supplying said amplified pulses to said remote cathode ray tube.

3. In a radio pulse receiving system, in combination, a wide band amplifier constructed and arranged to maintain a high resolution of received pulses, a remote cathode ray tube at a distance from said amplifier, a filter circuit connected to a voltage output of said wide band amplifier for averaging the voltage envelope of said high resolution pulses, and means connected to said filter for supplying said averaged voltage pulses to the control grid of said remote cathode ray tube.

4. In a radio pulse receiving system, in combination, a local cathode ray tube, a wide band amplifier for providing a high resolution indication of received pulses on the screen of said local cathode ray tube, a remote cathode ray tube at a distance from said amplifier, a filter circuit connected to a voltage output of said wide band amplifier for averaging the voltage of said pulses, a voltage amplifier in circuit with said filter for amplifying said averaged voltage pulses, and means connected to said amplifier for supplying said amplified voltage pulses to the control grid of said remote cathode ray tube.

5. A radio pulse system comprising a directional antenna, means for scanning said antenna over a portion of space, a wide band receiver connected to said antenna for detecting short pulses of energy absorbed by said antenna, a local cathode ray tube actuated by said receiver in accordance with said detected pulses, a remote cathode ray tube, and averaging means connected to said receiver and in circuit with said remote cathode ray tube for averaging and applying said pulses of energy to the remote cathode ray tube.

6. A radio pulse system comprising a directional antenna, means for scanning said antenna over a portion of space, a receiver connected to said antenna and having a wide band amplifier to provide a high resolution indication on the screen of a local cathode ray tube, a remote cathode ray tube, means responsive to said scanning means for positioning the cathode ray beam of said remote cathode ray tube in accordance with the position of said antenna, and averaging means connected to said receiver for controlling said remote cathode ray tube in accordance with the reception of energy by said antenna.

7. A radio pulse system comprising a directional antenna, means for scanning said antenna over a portion of space, a receiver connected to said antenna and having a wide band amplifier to provide a high resolution indication on the screen of a local cathode ray tube, a remote cathode ray tube, means responsive to said scanning means for positioning the cathode ray beam of said remote cathode ray tube in accordance with the position of said antenna, means connected to said receiver for averaging short, sharp pulses of energy received thereby, and amplifying means in circuit with said averaging means for controlling said remote cathode ray tube in accordance with the reception of energy by said antenna.

8. A radio pulse system comprising a directional antenna, means for scanning said antenna over a portion of space, a receiver connected to said antenna and having a wide band amplifier to provide a high resolution indication on the screen of a local cathode ray tube, a filter connected to the output of said wide band amplifier for averaging energy received by said antenna, an amplifier in circuit with said filter for amplifying and applying said averaged energy to the grid of a remote cathode ray tube, and means for positioning the cathode ray beam of said remote cathode ray tube in accordance with the position of said antenna.

9. A radio pulse system comprising a directional antenna, means for scanning said antenna over a portion of space, a receiver connected to said antenna and having a wide band amplifier to provide a high resolution indication of received pulses on the screen of a local cathode ray tube, a filter connected to the output of said amplifier for averaging the received pulses, an amplifier for controlling the grid of a remote cathode ray tube in accordance with said averaged pulses, and means responsive to said scanning means for positioning the cathode ray beam of said remote cathode ray tube in accordance with the position of said antenna.

GIFFORD E. WHITE.

REFERENCES CITED

The following references are of record in the file of this patent:

UNITED STATES PATENTS

| Number | Name | Date |
|---|---|---|
| 2,307,249 | Willans | Jan. 5, 1943 |
| 2,231,929 | Lyman | Feb. 18, 1941 |
| 2,237,440 | Jones | Apr. 8, 1941 |